United States Patent [19]

Murray

[11] 4,224,628
[45] Sep. 23, 1980

[54] GENERAL PURPOSE COMBINED ALPHANUMERIC/GRAPHICS PRINTER

[75] Inventor: Robert C. Murray, Auburn Heights, Mich.

[73] Assignee: The Valeron Corporation, Troy, Mich.

[21] Appl. No.: 938,433

[22] Filed: Aug. 31, 1978

[51] Int. Cl.³ ............................................. G01D 15/10
[52] U.S. Cl. ............................................. 346/76 PH
[58] Field of Search ................................... 346/76 PH

[56] References Cited

U.S. PATENT DOCUMENTS

| | | | |
|---|---|---|---|
| 3,840,878 | 10/1974 | Houston et al. | 346/76 PH X |
| 3,846,783 | 11/1974 | Apsell et al. | 346/76 PH X |
| 3,949,408 | 4/1976 | Mason et al. | 346/76 PH X |
| 3,971,041 | 7/1976 | Mason | 346/76 PH |
| 4,070,680 | 1/1978 | Shelley | 346/76 PH |
| 4,090,059 | 5/1978 | Kilby et al. | 346/76 PH X |
| 4,134,696 | 1/1979 | Hanakata et al. | 346/76 PH X |

Primary Examiner—George H. Miller, Jr.
Attorney, Agent, or Firm—Krass & Young

[57] ABSTRACT

A general purpose, microprocessor-based printer utilizing a thermal printhead graphic dot matrix features the capability of accepting either digital or analog data from a host system or device and or printing in either data logging, textual, or strip chart recorder format. In addition to preprogrammed alphanumeric character sets, the printer controller can print any symbol or shape adaptable to a dot matrix that may be specified by data transmitted from the host system. An analog input section of the printer is provided for applications where the host input data values to be graphed are not available in digital form. The analog input section further includes selectable chart paper speed settings, a chart input range selector, zero positioner, and a visual low paper indicator.

14 Claims, 4 Drawing Figures

GENERAL PURPOSE COMBINED ALPHANUMERIC/GRAPHICS PRINTER

BACKGROUND OF THE INVENTION

1. Field of the Invention

The invention generally relates to variable format printing devices. More particularly, the invention pertains to microprocessor-controlled printer peripheral units using thermal printhead dot matrices and heat-sensitive paper as the print medium for producing documentation of data received from a host system.

2. Description of the Prior Art

Printing peripherals are presently available for host systems requiring the production of printed documentation. Such a host might comprise, for example, a power monitor, gaging station, or process controller. The documentation printed may consist of alphanumeric characters, or graphs.

Typical applications require a printer that is physically small and durable and that prints on two-inch wide paper. Reports generated by the printer could be entered into a daily operations log or passed along a production line with the parts to which the report pertains. Commonly, the printer would be mounted in a vertical panel with the paper feeding out and down the face of the panel. In this configuration, the print would likely comprise a data log with any printed characters appearing upright. On the other hand, a text printer mounted in a vertical panel would typically generate characters positioned such that when the paper tape would be inverted, the message would read as printed top to bottom.

Because such peripheral printers use narrow paper (e.g. 2 inches), graphical dot displays are best generated with the time axis running the length of the paper. Labels and messages printed on the graph's axis should likewise run vertically with the direction of paper feed. A graph produced in this way is commonly called a strip chart.

Most printer peripherals have limited and fixed character sets governed by print hammers or other mechanical apparatus, which causes resultant print documentation to be cryptic and ambiguous. Furthermore, the typical printing peripheral is optimized for a specific type of printing or for graphing and has insufficient versatility to simultaneously handle both types of documentation.

When a printer with only an alphanumeric character set generates a strip chart graph, the resultant output is comprised of data points represented by characters having very low resolution. Also, many chart recorders of the prior art have no alphanumeric capability for producing labeled charts or graphs.

Further prior art peripheral printer deficiencies involve interfacing inflexibility between printer and host. The typical prior art printer peripheral accommodates a single type date communication interface, or worse yet, leaves all interfacing details to the user.

Finally, no chart or strip chart recorders known in the art accept both analog and digital data as a standard feature without the need for circuitry changes in the printer controller.

SUMMARY OF THE INVENTION

Therefore, it is an object of this invention to provide a peripheral printer having a flexible, software-controlled output format.

It is a further object of the invention to furnish a peripheral printer capable of simultaneously accepting digital and analog data from a host device.

Briefly summarizing the invention, a general purpose peripheral printer includes a microcomputer-based control unit coupled to a host system or device for receipt of data to be documented. A buffer electronics section coupled between the microcomputer control unit and a thermal printhead utilizes signals received from the control unit to activate selected thermal elements for producing darkened dots on heat-sensitive printout paper, one row at a time. The microprocessor-based control unit additionally couples control signals to a paper advance stepper motor, thereby determining desired paper speed. The host system may additionally be coupled to an analog input section of the printer in those applications where the data to be graphed is not available in digital form. Paper speed and input signal range selector switches are provided in the analog input section.

It is a feature of this invention that software-controlled printing format enables characters of any shape adaptable to generation by a dot matrix to be printed vertically, horizontally, upside down or in any other orientation specified.

A further feature of the invention is that the use of the analog input section enables the printer to emulate an analog strip chart recorder with simultaneous textural documentation capability and crystal-controlled chart paper speed.

DETAILED DESCRIPTION OF THE DRAWINGS

These and other objects and features of the invention will become apparent from a reading of a detailed description of a preferred embodiment, taken in conjunction with the drawing in which.

DETAILED DESCRIPTION

Figure 1:
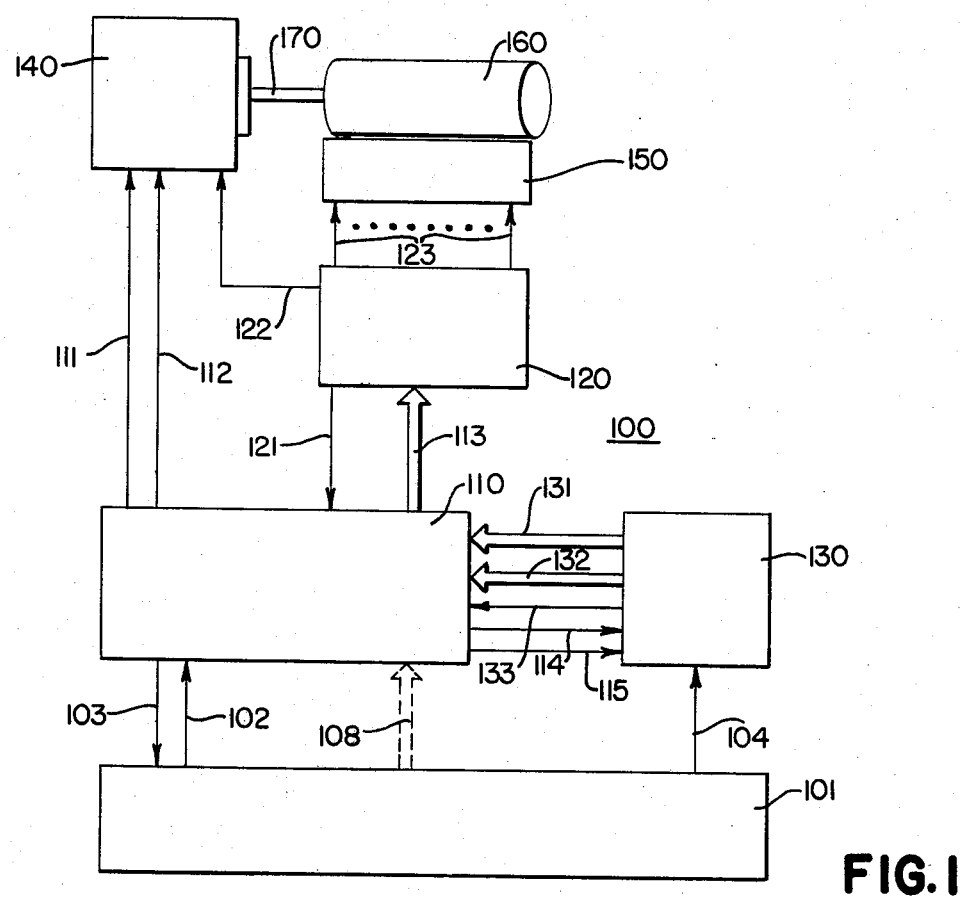
FIG. 1 is a functional block diagram of a printer peripheral unit shown coupled to a host system.

General System Organization and Operation—FIG. 1

FIG. 1 depicts a printer peripheral 100 interconnected with a host system 101 in a configuration designed in accordance with the principles of the invention. It should be noted with subsequent reference to the drawing figures that identical numerical designators are used for all interconnection paths shown in FIG. 1. Therefore, FIG. 1 may be used as a convenient reference in determining source or destination of various paths shown in FIGS. 2-4.

Referring to FIG. 1, host system 101 is coupled to a microcomputer controller 110 via a serial data link 102. Path 103 carries a signal from microcomputer 110 indicative of a ready-to-receive state therein. Dashed bus 108 indicates that the host 101 may optionally couple parallel binary input data to microcomputer 110.

For the purposes of this disclosure, the term "microcomputer" is used to indicate a microprocessor-based data processing system including any required memory, peripheral interface adapters, asynchronous communication interface adaptors, and miscellaneous peripheral units coupled to the microprocessor bussing structure, such as programmable timer modules. The organization of a microcomputer suitable for use with the instant invention is set forth below in conjunction with FIG. 2.

Also for the purposes of this disclosure, the term "host-system", or "host", is used to indicate any device or system-organized plurality of devices producing analog or digital data that requires documentation. Such a host could, for example, comprise a horsepower or electrical energy monitor, a gaging station, or a general purpose process controller. The required documentation could comprise alphanumeric text, data logs, graphics, or a combination of two or more of these items.

Returning to FIG. 1, host 101 is additionally coupled via path 104 to an analog input section 130 of printer peripheral 100. Path 104 couples analog data to the printer for those applications wherein the host cannot conveniently supply data to be documented in digital form.

Microcomputer 110 couples step commands via paths 111, 112 to a stepper motor 140, which, in turn, advances heat-sensitive paper 160 via rotating shaft 170 under a thermal printhead 150. Microcomputer 110 is coupled to printhead interface circuitry 120 via multipath bus 113 and path 121. An additional motor control signal is coupled from interface 120 to drive circuitry of stepper motor 140 via path 122.

Printhead 150 has a single row matrix of thermal print elements that are activated according to signals received over paths 123 from interface circuitry 120. The thermal printer transport, including a suitable two-phase permanent magnet stepper motor 140 and a thermal printhead graphic dot matrix, could, by way of example, comprise a model GAP-101M, with detailed specifications commercially available from Gulton Industries, Inc., East Greenwich, Rhode Island, 02818.

For purposes to be discussed below, microcomputer 110 is additionally coupled to analog input section 130 via parallel binary bus paths 131 and 132 and by individual paths 114, 115, and 133.

Summarizing the printer's general operation with reference to FIG. 1, host system 101 presents digital data to be documented over serial path 102 to microprocessor 110, or host 101 presents analog data to be graphed over path 104 to analog input section 130, or host 101 may present both digital data (via path 102) and analog data (via path 104) to printer 100 for generation of textually documented graphs (e.g. labels for axes). Microcomputer 110 processes digital data received via path 102 for presentation of a plurality of serial control data messages via bus 113 to printhead interface circuitry 120.

Analog data received via path 104 to analog input section 130 is suitably amplified, filtered, and converted to digital data representative of analog input samples for presentation to microcomputer 110 via bus 131.

Hence, whether received directly from host 101 or from a converter in analog input section 130, digital documentation data is processed by microcomputer 110, and control data is generated accordingly for enabling appropriate print elements of thermal printhead 150 via interface circuitry 120. Additionally, appropriate stepper motor commands are generated by microcomputer 110 at paths 111, 112, thereby establishing a desired speed of advance of print paper 160 beneath printhead 150.

Microcomputer 110 further functions, in cases where a graphical output is being displayed, to generate a grid overlay on the print paper, either according to an internally stored standard grid pattern, or in response to separate grid data input via path 102 from host 101 prior to the transmission of the data points to be graphed.

Likewise, paper feed rate may be determined by microcomputer 110 via an internally stored standard, or from manual settings at analog input section 130. Alternatively, paper speed can be defined and set via digital data received directly from host 101 prior to transmittal of data to be graphed.

Figure 2:
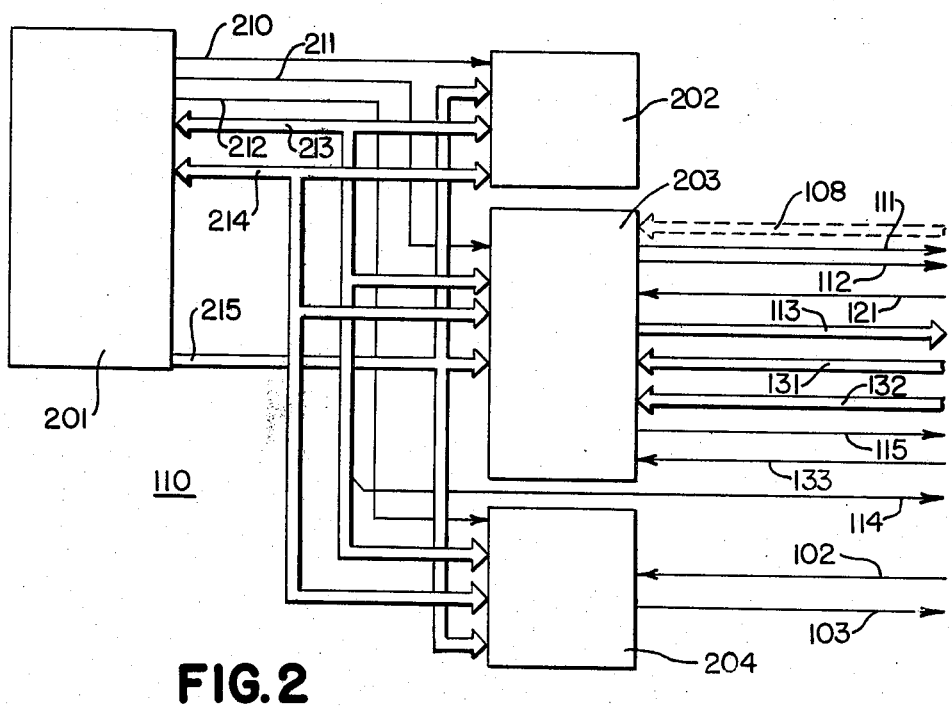
FIG. 2 is a functional block diagram of microcomputer controller 110 of FIG. 1.

Microcomputer—FIG. 2

Microcomputer 110 of FIG. 1 is set forth in more detail in FIG. 2. Functional block 201 of FIG. 2 represents a conventional IC microprocessor complex, such as the Motorola MC6802 microprocessor chip, along with suitable memory elements such as read-only memory (ROM), and random access memory (RAM) and appropriate address decoding logic for generating IC chip enable signals. Such a typical microprocessor arrangement is well-known in the art, and the details will not be further set forth herein.

Other conventional commercially available elements typically found in a microcomputer are also shown in functional block form in FIG. 2. Block 202 represents a programmable timer module (PTM), such as the commercially available Motorola MC6840. Block 203 represents a peripheral interface adaptor (PIA) comprised of a plurality of commercially available devices such as the Motorola MC6821. Block 204 represents an asynchronous communication interface adaptor (ACIA) for receiving serial data and presenting same in parallel, microcomputer bus-compatible form. One such commercially available ACIA is the Motorola MC6850.

Peripheral IC chip enabling signals are coupled from an address decoder (not specifically shown) of microprocessor complex 201 via paths 210, 211, and 212, respectively, to PTM 202, PIA 203 and ACIA 204. An address bus 215 couples microprocessor complex 201 to PIA 203, PTM 202, and ACIA 204 while bidirectional data bus 214 and miscellaneous control and timing bus 213 interconnect microprocessor complex 201 with PTM 202, PIA 203, and ACIA 204.

Serial data from host system 101 (FIG. 1) is received at ACIA 204 over path 102 in response to a "request to send" logic level signal presented by ACIA 204 to path 103.

Alternatively, host 101 could present parallel output digital data via optional dashed parallel bus 108 to PIA 204 for scanning by microprocessor complex 201 via address bus 215 and data bus 214.

It will be apparent to those skilled in the art that the arrangement of FIG. 2 will easily accommodate a number of conventional interface arrangements for coupling digital data from the host system 101 to microcomputer 110. For example, the serial data path 102 may accommodate serial ASCII via RS232 or TTL type data interfacing arrangements. In addition to the optional parallel binary data input to a PIA (such as shown by dashed optional data input bus 108), IEEE 488 interfacing can be accommodated using commercially available IC units such as the Motorola 68488 for coupling such data to the microcomputer bus.

Motor step commands are coupled to stepper motor 140 (FIG. 1) via paths 111, 112 from outputs of PIA 203. As previously mentioned, stepper motor 140 is a permanent magnet, bifilar, wound, two-phase stepper motor with four stator windings arranged in a known manner. To completely specify the conduction state of all four motor windings, microcomputer 110 outputs a 2-bit binary command code over paths 111, 112 for use by circuitry of motor 140. Such circuitry being well known in the art, no further detailed description of it will be set forth herein. For this embodiment, the step commands are furnished to PIA 203 by microprocessor complex 201 in conjunction with PTM 202. The time interval between successive step commands is generated by loading a binary number, whose value is determined by microprocessor complex 201, into PTM 202, which counts down to zero from the number so loaded and which, upon reaching zero count, interrupts microprocessor complex 201 via control bus 213. Upon receipt of a PTM interrupt, microprocessor complex 201 outputs the next set of step command signals to PIA 203 for transmission to stepper motor 140 via paths 111 and 112. In this manner, a precise paper speed corresponding to a desired time period per unit of paper advanced is attained. Data therefore, can be graphed accurately as a function of such time period.

When not generating graphs, the printer need not utilize the above-described time-delayed motor step command sequence generated in conjunction with PTM 202. Instead in non-graphic textual print modes, the print paper speed is constrained only be a data registration time interval required by printhead interface 120, to be described in more detail below with reference to FIG. 3.

In a manner to be described below in conjunction with FIG. 3, path 121 couples a "ready" signal from the printhead interface 120 to PIA 203. This signal inform microprocessor complex 201 that it may proceed with the next control data message. Control data messages are coupled to printhead interface 120 via PIA 203 and bus 113.

Digital data converted from analog signals received at analog input section 130 (FIG. 1) are coupled via bus 131 to PIA 203 for scanned receipt by microprocessor complex 201 over data bus 214. Paper speed settings from analog input section 130 are coupled to PIA 203 via bus 132 for similarly effected reading by microprocessor complex 201.

In a manner to be described in more detail below in conjunction with FIG. 4, an analog to digital (A/D) converter in analog input section 130 (FIG. 1) presents converted digital data at bus 131 in response to a "start conversion" signal coupled via path 115 from PIA 203 to analog input section 130. The A/D converter at section 130 is timed with the same system clock used by microcomputer 110, whose clock signal pulses are coupled to various user entities via path 114 of miscellaneous control bus 213.

Path 133 couples a low paper indication of PIA 203 from analog input section 130 (FIG. 1). The generation of the low paper signal will be described below in more detail with reference to FIG. 4.

Figure 3:
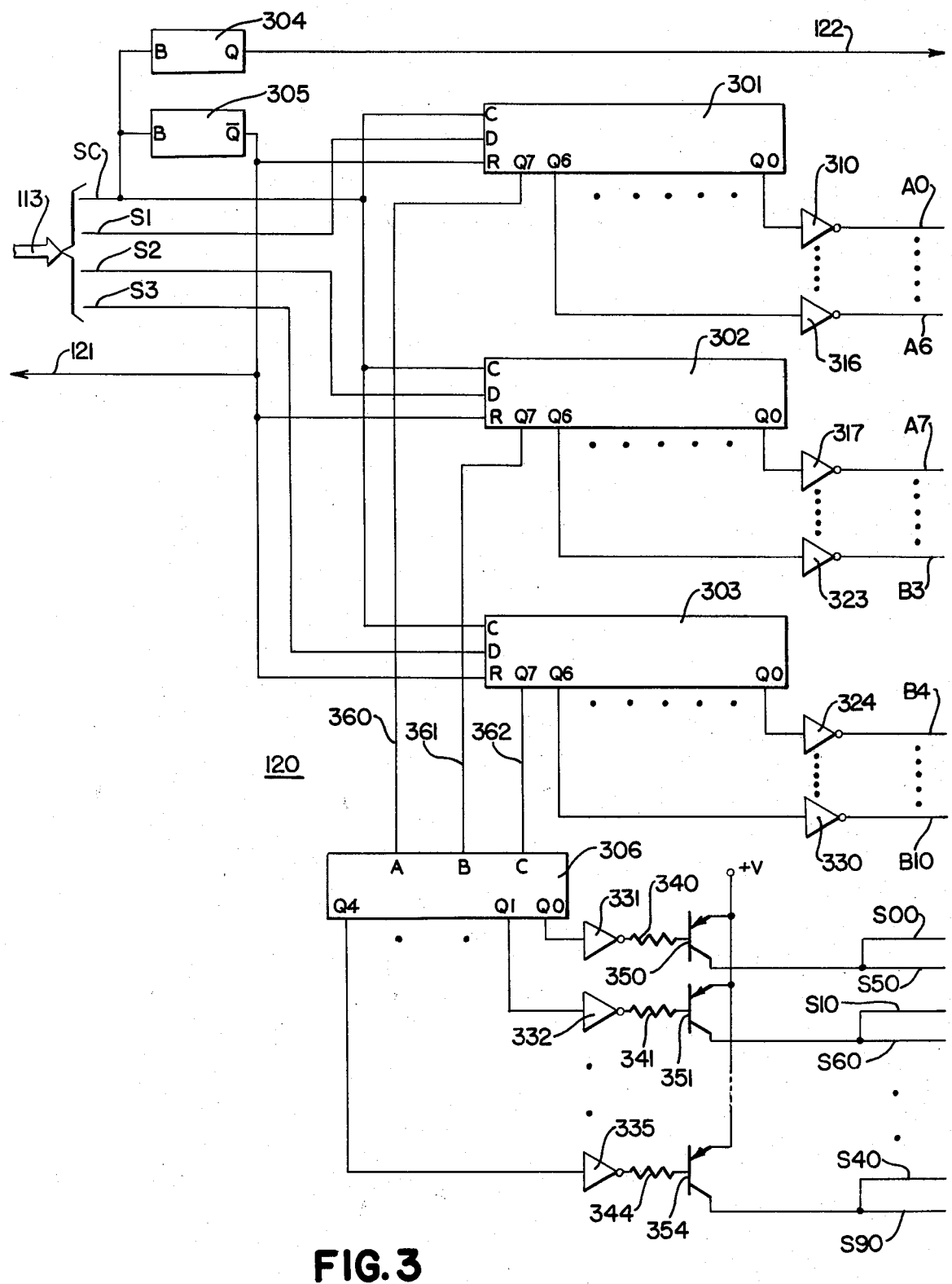
FIG. 3 is a more detailed functional schematic of printhead interface circuitry 120 of FIG. 1.

Printhead Interface—FIG. 3

A more detailed functional diagram of printhead interface 120 of FIG. 1 is set forth in FIG. 3. As mentioned above, the printer peripheral of the illustrative embodiment utilizes a Gulton GAP-101M thermal printer. The thermal printhead included in this commercial package is a Gulton DM10101 dot matrix graphics printhead, which is comprised of a single row of 101 thermal print elements, or dots, organized for addressing purposes into nine groups, or columns, of ten dots each, and one group, or column, of eleven dots. Each dot column group is provided with an enable address lead. These ten leads are designated S00–S90 in FIG. 3. Note the column enable lines are coupled in pairs, S00 and S50, S10 and S60, S20 and S70, etc.

Two dot address busses, A0–9 and B0–10 are used to complete the address selection of individual dot elements in conjunction with the enable lines. Bus A0–9 has paths coupled to similarly designated dot elements in columns S00–S40, while B0–10 has ten of its paths (B0–B9) coupled to similarly designated dot elements in columns S50 through S80, and all eleven paths (B0–B10) coupled to the eleven dot elements of column S90.

With the above described organization, to completely specify one full 101 element line of print requires five successive control data messages from microcomputer 110 (FIG. 1)—i.e. one data message for each columnar pair of 20 (or 21) dot elements.

Referring to FIG. 3, input control data bus 113 from microcomputer 110 (FIG. 2) is seen to comprise a shift clock lead, SC, and three serial data paths, S1–S3. Path SC is coupled to the trigger, or B, inputs of monostable multivibrators 304 and 305, and to the clock, or C, inputs of serial-in, eight-bit parallel-out shift registers 301, 302, and 303. Monostable multivibrators 304 and 305 could, for example, comprise Motorola type MC14538, while registers 301–303 could comprise Motorola type MC14015.

Serial data paths S1–S3 are respectively coupled to data, or D, inputs of registers 301–303. The Q output of monostable 304 is coupled via path 122 to power circuitry of stepper motor 140 (FIG. 1), while the Q̄ output of monostable 305 is coupled to a reset, or R, input of each of the registers 301–303, and to path 121 which couples a "ready" indication back to microcomputer 110 (FIG. 2).

The first seven parallel outputs, Q0–Q6, of register 301 are respectively coupled via buffer amplifiers 310–316 to printhead dot address paths A0–A6, while the seventh output, Q7, of register 301 is coupled via path 360 to an A input of binary to one-of-five decoder 306. Decoder 306 could, for example, comprise Motorola type MC14028, while amplifiers 310–316 (and below-discussed amplifiers 317–335) could comprise Motorola type MC1413 components.

The first seven parallel outputs, Q0–Q6, of register 302 are respectively coupled via buffer amplifiers 317–322 to printhead dot address paths A7–A9, B0-B3, while the seventh output, Q7, of register 302 is coupled via path 361 to a B input of decoder 306.

Similarly, the first seven outputs, Q0–Q6 of register 303 are respectively coupled via buffer amplifiers 324–330 to printhead dot address paths B4–B10, while the seventh output, Q7, is coupled via path 362 to a C input of decoder 306.

Outputs Q0–Q4 of decoder 306 are respectively coupled to the base electrodes of driver transistors 350–354 via buffer amplifier-resistor combinations 331, 340 through 335, 344. The emitter electrodes of transistors 350–354 are commonly coupled to a potential source +V, suitable for driving the thermal printhead matrix dot elements. Column enable path pairs S00, S50 through S40, S90 are respectively coupled to the collector electrodes of transistors 350–354.

With the above described circuit arrangement, interface 120 receives a 24 bit control data group via registers 301–303 for each group of twenty (twenty-one for column pair S40, S90) printhead dot elements. The high order parallel bit output, Q7, of each of the three registers is used for forming a three-bit column binary designator which is decoded via decoder 306 to render one of the five transistors 350–354 conductive. Then those dots coupled to address lines A0–A9, B0–B10 carrying logic low levels in the selected column-pair group will be activated. It will be apparent to those skilled in the art that address line B10 will only be used in conjunction with column pair S40, S90–S90 being the only dot group of the printhead containing eleven elements.

Hence, by software control of the print element dots of any given line on the print paper, it is seen that microcomputer 110 (FIG. 1 or FIG. 2) can flexibly control the resultant print format in conjunction with the buffer electronics of interface 120. Alphanumeric character format, can for example, be controlled by microcomputer 110 via read-only memory (ROM) character generators such as IC chip types MC6670 or MC6674, commercially available from Motorola, Inc.

The serial data at S1–S3 is shifted into registers 301–303 under control of shift clock pulses at path SC sent from microcomputer 110 (FIG. 2). The initial SC pulse is utilized to trigger timing monostables 304 and 305.

Upon triggering, monostable 304 provides a logic one pulse of a first predetermined length over path 122 to the power circuitry of stepper motor 140 (FIG. 1) to indicate a request for high level motor drive current in preparation for advancing the heat-sensitive printing paper.

Upon triggering, monostable 305 provides a logic zero pulse at its $\overline{Q}$ output to initialize the contents of registers 301–303. Upon termination of this logic zero pulse, a return to logic one provides an indication via path 121 to microcomputer 110 that the interface is ready to receive serial data via paths S1–S3.

Figure 4:
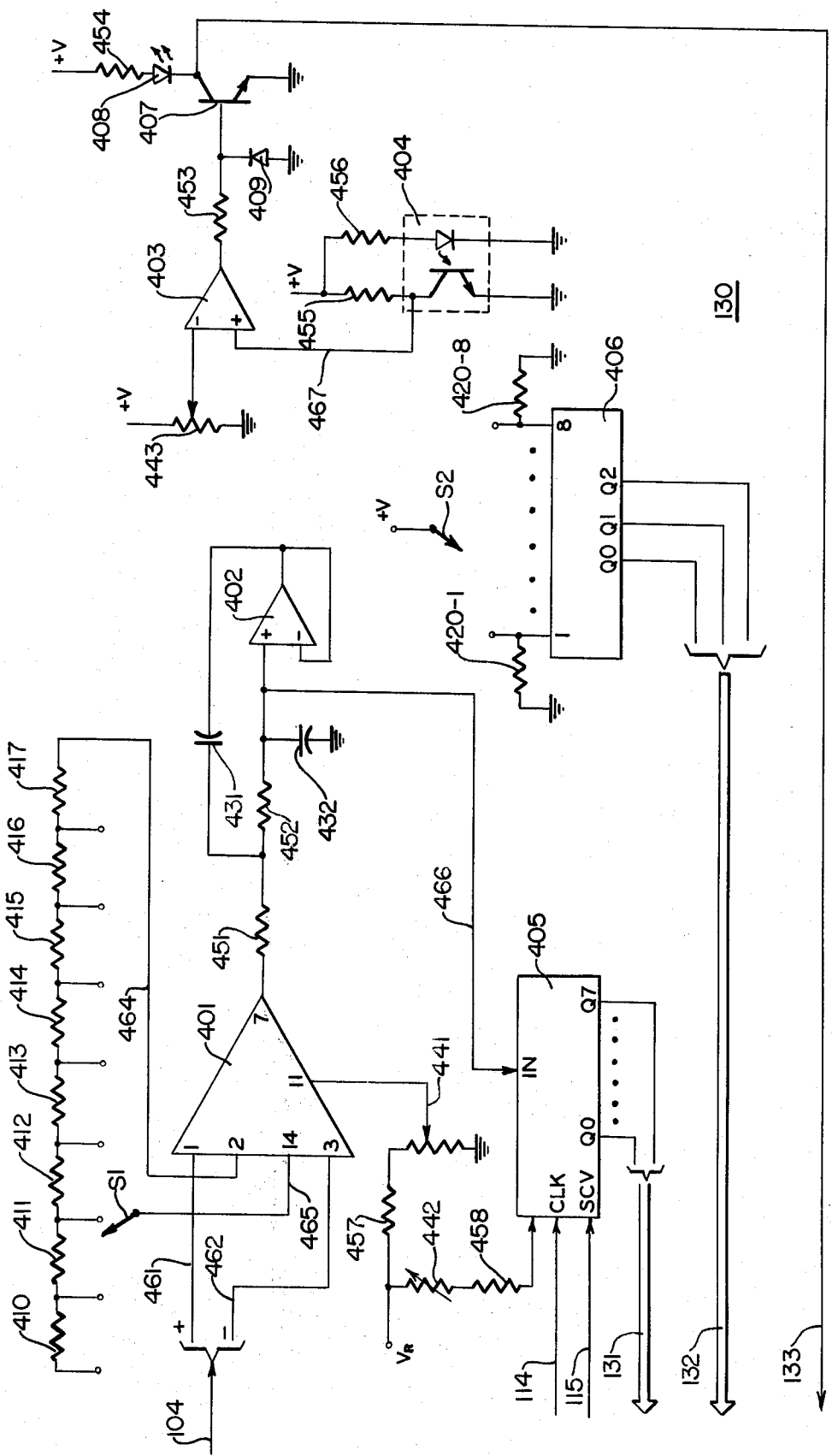
FIG. 4 is a more detailed schematic depiction of analog input section 130 of FIG. 1.

Analog Input Section—FIG. 4

Analog input section 130 of FIG. 1 is shown in more detail in FIG. 4. Section 130 generally functions to accept analog data to be graphed from the host system 101 (FIG. 1) and to provide manually adjustable switches for selecting variable chart speeds, graph zero positions, and chart input signal ranges. Analog section 130 also contains apparatus for determining and indicating a low print paper condition in the printer peripheral.

Referring to FIG. 4, analog signals appearing across paths 461 and 462 are presented from host system 101 (FIG. 1) via cable 104 to input terminals one and three of instrumentation amplifier 401. Instrumentation amplifier 401 could, for example, comprise type AD521, commercially available from Analog Devices.

Amplifier 401 applies a gain factor to the potential appearing across terminals 1 and 3 substantially determined by the resistance value applied between amplifier terminals 2 and 14. As seen from FIG. 4, switch S1 couples a resistance value across terminals 2 and 14 dependent upon the switch wiper position determined by contacts interposed as shown among resistors 410–417. Hence, switch S1 may conveniently be calibrated in terms of input signal range to be represented by a grid pattern on any graphical printout of analog data presented to adjustable amplifier 401.

The analog output voltage of amplifier 401 is presented to amplifier terminal 7 and is measured with respect to a reference signal at terminal 11. Terminal 11 of amplifier 401 is coupled by potentiometer 441 to a precision reference potential designated $V_R$. The wiper of potentiometer 441 is made externally available for manual adjustment of the reference potential presented to terminal 11 of amplifier 401, thereby providing a manually variable "zero" adjustment for the resulting graphical display of analog data presented to analog input section 130.

Amplified analog data at terminal 7 of amplifier 401 is coupled via path 466 to the data input terminal of an A/D converter 405 via a low pass filter comprised of resistors 451 and 452, capacitors 431 and 432, and operational amplifier 402. Converter 405 could, for example, be comprised of commercially available IC chip-type MM5357 of National Semiconductor Corp.

A/D converter 405 converts an analog signal appearing at the IN terminal to an eight-bit binary digital representation at outputs Q0–Q7. The converter is timed via microcomputer 110 clock pulses coupled to a CLK input via path 114. An analog sample at terminal IN is digitally encoded after a "start conversion" signal is coupled to converter input SCV via path 115 from microcomputer 110 (FIG. 2). The "full scale" analog potential represented by the digital output Q0–Q7 of converter 405 is determined by the potential coupled to converter 405 from reference $V_R$ via trim potentiometer 442 and resistor 458. The converter's digital output at Q0–Q7 is coupled to microcomputer 110 (FIG. 2) via bus 131.

Also shown in FIG. 4 is switch S2 whose wiper arm couples a potential, +V, to one of eight positions, 1–8, corresponding to inputs of one-out-of-eight to binary encoder 406. Encoder 406 could, for example, be comprised of IC type MC14532, commercially available from Motorola, Inc. Each switch position is respectively coupled via resistors 420-1 through 420-8 to ground potential. Switch S2 is conveniently calibrated in terms of desired print paper, or so-called "chart", speed for documenting analog data in graphical strip chart format. The binary representation of the selected chart speed at encoder outputs Q0–Q2 is coupled to microcomputer 110 (FIG. 2) via bus 122.

A "low paper" indication is coupled to microcomputer 110 via path 133. Optical proximity detector 404 is coupled via resistors 455, 456 to potential +V. When the roll of print paper 160 (FIG. 1) diminishes to a predetermined diameter, proximity detector 404 is triggered to couple a signal via path 467 to a non-inverting input of comparator amplifier 403. An inverting input to comparator 403 is coupled to potential +V via trim potentiometer 443, while the output of comparator 403 is coupled via resistor 453 to a base electrode of transistor 407.

A base-emitter junction protection diode 409 is coupled between the base of 407 and ground. The emitter electrode of transistor 407 is grounded, while the collector electrode of 407 is coupled to path 133 and, via light emitting diode (LED) 408 and resistor 454, to potential source +V.

Hence, a low-paper indicating positive-going signal at path 467 produces sufficient base drive via resistor 453 to render transistor 407 conductive, thereby coupling a logic zero indicator signal via path 133 to microcomputer 110 and simultaneously illuminating LED 408 to provide a visual "low paper" indication at the control panel of analog input section 130.

The invention has been described with reference to an illustrative embodiment solely for the sake of example. Other alternative approaches will become apparent to those skilled in the art after examination of the above description. Accordingly, the invention is intended to be limited solely by the scope and spirit of the appended claims.

The embodiments of the invention in which an exclusive property or privilege is claimed are defined as follows:

1. A general purpose printer for generating documentation of data supplied thereto by a host system, the printer comprising:
    a stationary printhead including a plurality of thermal dot printing elements organized as a linear array for generating dot patterns on a heat-sensitive print medium;
    a microcomputer coupled for receipt of digital data from the host system, operative to provide output data of a nonrestrictive format;
    first interface means coupled between the microcomputer and the printhead, operative to convert data received from the microcomputer into enabling signals for selected dot printing elements;
    stepper motor means having a rotatable member coupled to a roll of heat sensitive paper and drive circuit means coupled to the microcomputer, operative to move the heat sensitive paper relative to the printhead at a rate determined by signals received from the microcomputer; and
    the microcomputer including a microprocessor having associated addressable memory means, addressable peripheral interface adaptor means for coupling the microprocessor to the first interface means, addressable asynchronous communication interface adaptor means for coupling serial input digital data from the host system to the microprocessor, and programmable timer means coupled to the microprocessor, operative to generate timing signals for use by the microprocessor in transmitting step commands via the peripheral interface adaptor means to the stepper motor drive circuit means.

2. The printer of claim 1 further comprising:
    an optical proximity detection means operative, as positioned with respect to the roll of heat sensitive paper, to generate an output signal whenever the paper roll decreases to a predetermined diameter to allow an optical source to trigger the detection means;
    means for coupling the output signal to the microcomputer; and
    a light emitting diode coupled to optical proximity detection means, illuminated in response to the generation of the output signal, thereby operative to provide a visual indication of the occurence of the output signal.

3. The printer of claim 1 wherein the microcomputer means further comprises:
    means for automatically generating grid data for transmission to the first interface means, the grid data enabling the first interface means to generate, via the printhead, a predetermined grid overlay pattern on the printing medium simultaneously with the generation of a graphical data display;
    and means for recognizing an override request from the host system, and for inhibiting the means for automatically generating, and for producing grid overlay data in accordance with digital data received directly from the host system.

4. The printer of claim 1 wherein the addressable peripheral interface adaptor means is coupled to the host system for receipt of parallel data therefrom.

5. The printer of claim 1 wherein the peripheral interface adapter means includes means for serial data communication between the microprocessor and the first interface means.

6. The printer of claim 5 wherein the first interface means further comprises serial-in, parallel-out register means coupled for receipt of serial data sent from the microprocessor via the peripheral interface adapter means.

7. The printer of claim 6 wherein the array of thermal print elements comprises a plurality of element groups, each group including a plurality of print elements, with each print element of a group commonly coupled to a group enable signal carrying path;
    and wherein the first interface means further comprises logic means having inputs coupled to a first output portion of the serial-in, parallel-out register means and having a plurality of outputs each coupled to a corresponding one of the group enable signal carrying paths, the logic means operative to convert a binary number presented to its inputs into a single enable signal at one of its outputs.

8. The printer of claim 7 wherein the first interface means further comprises:
    a plurality of outputs coupled to a second output portion of the serial-in, parallel-out register means, each output further coupled to a similarly-designated printing element in each element group;
    whereby an individual printing element is activated whenever a signal of predetermined time, magnitude, and polarity is applied to its corresponding second portion output simultaneously with application of an enabling signal for an element group containing the individual printing element.

9. The printer of claim 1 further comprising:
    second interface means coupled between the host system and the microcomputer, operative to receive analog input signals from the host system and to convert the analog signals into digital form for transmission to the microcomputer.

10. The printer of claim 9 wherein the second interface means further comprises:
    encoding means having an integral number, N, of inputs, operative to convert a one-of-N code presented to its inputs into a binary number for presentation to a plurality of outputs coupled in parallel to the stored program control means; and
    switch means having N positions, each position operative when selected to apply a predetermined logic level signal to a corresponding one of the encoding means inputs, with the switch positions calibrated in terms of speed of the print medium relative to the printhead.

11. The printer of claim 9 wherein the microcomputer means further comprises:

means for reading textual input digital data directly from the host system;

means for reading converted digital data from the second interface means, the converted data corresponding to analog data input from the host system to the second interface means; and means for generating control data as a function of both the textual and converted data for use by the first interface means, the control data organized such that a combined textual and graphic data display is generated by the printhead onto the print medium.

12. The printer of claim 9 wherein the second interface means further comprises:

adjustable amplification means having an input coupled for receipt of the analog input signals; and analog to digital converter means having an input coupled to an output of the adjustable amplification means and a plurality of digital outputs parallel-coupled to the stored program control means.

13. The printer of claim 12 further comprising:

switch means having a plurality of positions, each position operative when selected to couple a different gain-determining resistance value to the adjustable amplification means, with the switch means positions calibrated in terms of variable analog signal output range.

14. The printer of claim 13 further comprising:

a source of DC reference potential;

adjustable resistance means coupling the DC reference to the adjustable amplification means in a manner operative to provide a variable common reference level with respect to which the adjustable amplification means output is defined, thereby providing an adjustable zero level definition for the analog signals coupled to the analog to digital converter means.

* * * * *